(12) United States Patent
Lynas et al.

(10) Patent No.: US 8,302,902 B2
(45) Date of Patent: Nov. 6, 2012

(54) METHOD AND APPARATUS FOR OPERATING AN AIRCRAFT LANDING SYSTEM

(75) Inventors: Christopher Lynas, Bristol (GB); Iain Morgan, Bristol (GB)

(73) Assignee: Airbus Operations Limited, Bristol (GB)

( * ) Notice: Subject to any disclaimer, the term of this patent is extended or adjusted under 35 U.S.C. 154(b) by 1107 days.

(21) Appl. No.: 12/230,255

(22) Filed: Aug. 26, 2008

(65) Prior Publication Data

US 2009/0121077 A1 May 14, 2009

(30) Foreign Application Priority Data

Sep. 14, 2007 (GB) .................... 0717902.1

(51) Int. Cl.
*B64D 41/00* (2006.01)
*B64C 25/10* (2006.01)
(52) U.S. Cl. ...................... 244/58; 244/102 R
(58) Field of Classification Search ............ 244/58, 244/53 R, 102 R, 100 R
See application file for complete search history.

(56) References Cited

U.S. PATENT DOCUMENTS

| | | | | |
|---|---|---|---|---|
| 1,364,472 A | * | 1/1921 | Andrews | 244/58 |
| 2,777,524 A | * | 1/1957 | Chapman et al. | 416/53 |
| 2,988,327 A | * | 6/1961 | Nunn et al. | 415/44 |
| 5,122,036 A | * | 6/1992 | Dickes et al. | 417/222.1 |
| 5,484,120 A | | 1/1996 | Blakeley et al. | |
| 5,564,903 A | * | 10/1996 | Eccles et al. | 416/174 |
| 5,820,074 A | * | 10/1998 | Trommer et al. | 244/58 |
| 6,023,134 A | * | 2/2000 | Carl et al. | 318/140 |
| 2006/0102790 A1 | * | 5/2006 | Atkey et al. | 244/134 R |
| 2006/0260323 A1 | | 11/2006 | Moulebhar | |
| 2010/0170983 A1 | * | 7/2010 | Fervel et al. | 244/99.2 |

FOREIGN PATENT DOCUMENTS

GB 825844 12/1959

OTHER PUBLICATIONS

Great Britain Search Report for GB Application No. 0717902.1, dated Dec. 11, 2007.

* cited by examiner

*Primary Examiner* — Tien Dinh
(74) *Attorney, Agent, or Firm* — Nixon & Vanderhye P.C.

(57) ABSTRACT

A method and apparatus is disclosed in which an aircraft landing system is at least partly primarily powered by power provided by a ram air turbine (RAT).

24 Claims, 4 Drawing Sheets

METHOD AND APPARATUS FOR OPERATING AN AIRCRAFT LANDING SYSTEM

This application claims priority to Great Britain Application No. 0717902.1, filed 14 Sep. 2007, the entire contents of each of which are hereby incorporated by reference.

FIELD OF INVENTION

The present invention relates to a method and apparatus for operating an aircraft landing system.

BACKGROUND OF THE INVENTION

Aircraft are provided with aircraft-wide systems for distributing power under normal operating conditions. The power is distributed from a range of power sources to each location on the aircraft where the power is required. The power is generally in the form of hydraulic, pneumatic or electrical power from onboard generators powered by the aircraft's engines or from independently powered generators.

However, one problem with such aircraft-wide systems is that the cable or pipe runs are vulnerable to damage and require rigorous inspection and maintenance. Furthermore, the greater the physical distance between a generator and the site where its power is used, the greater the power losses in the pipe or cable-work. Also, longer pipe or cable runs increase the weight of the aircraft. In order to provide sufficient redundancy, multiple power systems are provided, further adding to the weight and complexity of the aircraft systems. Also, each power generator either directly or indirectly consumes aircraft fuel.

SUMMARY OF THE INVENTION

An embodiment of the invention provides apparatus for operating landing gear on an aircraft, the apparatus comprising:
a landing gear actuating system operable to actuate the landing gear of an aircraft;
a ram air turbine (RAT) arranged to provide a first power type to the actuating system; and
a control system operable to controllably supply the first power type from the RAT to the actuating system for moving the landing gear between a deployed and stowed positions.

The RAT may be located on the landing gear. The RAT may be located within a ram air duct in the aircraft structure. The actuating system may comprise an energy storage device. The energy storage device may be charged so as to compensate for any reduction in power provided by the RAT to the actuating system as a result of the RAT being moved into a reduced airflow in the proximity of an aircraft structure, the energy storage device being arranged to be charged so as to ensure the completion of the movement of the landing gear to the stowed position. The energy storage device may be charged prior to initiation of a movement of the landing gear. The energy storage device may be arranged to be charged via the RAT prior to any movement of the landing gear so as to provide power for a complete movement of the landing gear between the deployed and stowed positions. The RAT may provide power to the actuating system for at least part of the movement of the landing gear between the stowed position and the deployed position.

The control system may be further operable to supply the first power type from the RAT to a further aircraft landing system. The further aircraft landing system may be a braking system for the aircraft and the first power type is supplied from the RAT for the operation of the braking system during landing of the aircraft. The energy storage device may be arranged to be charged with energy from the RAT for powering the braking system when the output of the RAT is below a predetermined threshold. The actuating system or aircraft system may be powered by a second power type and the control system is operable to convert the first power type from the RAT to the second power type. The first or second power type may be hydraulic, pneumatic or electric.

Another embodiment provides apparatus for operating a braking system for an aircraft, the apparatus comprising:
a brake actuating system operable to actuate the brakes of an aircraft;
a ram air turbine (RAT) arranged to provide a first power type to the actuating system; and
a control system operable to controllably supply the first power type from the RAT to the brake actuating system for operating the brakes.

A further embodiment provides apparatus for operating an aircraft landing system for an aircraft, the apparatus comprising:
an actuating system operable to actuate aircraft landing system for an aircraft;
a ram air turbine (RAT) arranged to provide a first power type to the actuating system; and
a control system operable to controllably supply the first power type from the RAT to the actuating system for operating the aircraft landing system.

The aircraft landing system may be the landing gear for the aircraft. The aircraft landing system may be the braking system for the aircraft. The control system may be operable to controllably supply the first power type from the RAT as the primary power source to the actuating system for operating the aircraft landing system.

Another embodiment provides a method for operating landing gear on an aircraft, said method comprising the steps of:
a) receiving a command to move a set of landing gear for an aircraft between a deployed and stowed positions;
b) operating an actuating system arranged to move said landing gear between said deployed position and a stowed position; and
c) directing power from a ram air turbine (RAT) to said actuating system to move said landing gear between said deployed and stowed positions in response to said command.

A further embodiment provides a method for operating a braking system for an aircraft, said method comprising the steps of:
a) receiving a command to operate a braking system for an aircraft;
b) operating an actuating system arranged to move said landing gear between said deployed position and a stowed position; and
c) directing power from a ram air turbine (RAT) to said actuating system to operate said braking system in response to said command.

Another embodiment provides a method for operating an aircraft landing system for an aircraft, said method comprising the steps of:
a) receiving a command to operate an aircraft landing system for an aircraft;
b) directing power from a ram air turbine (RAT) to an actuating system for powering said aircraft landing system; and
c) operating said aircraft landing system in response to said command.

BRIEF DESCRIPTION OF THE DRAWINGS

Embodiments of the invention will now be described, by way of example only, with reference to the accompanying drawings in which:

FIG. 2b is a partial sectional side view of the landing gear of the aircraft of FIG. 2a;

DETAILED DESCRIPTION OF PREFERRED EMBODIMENTS OF THE INVENTION

Figure 1:
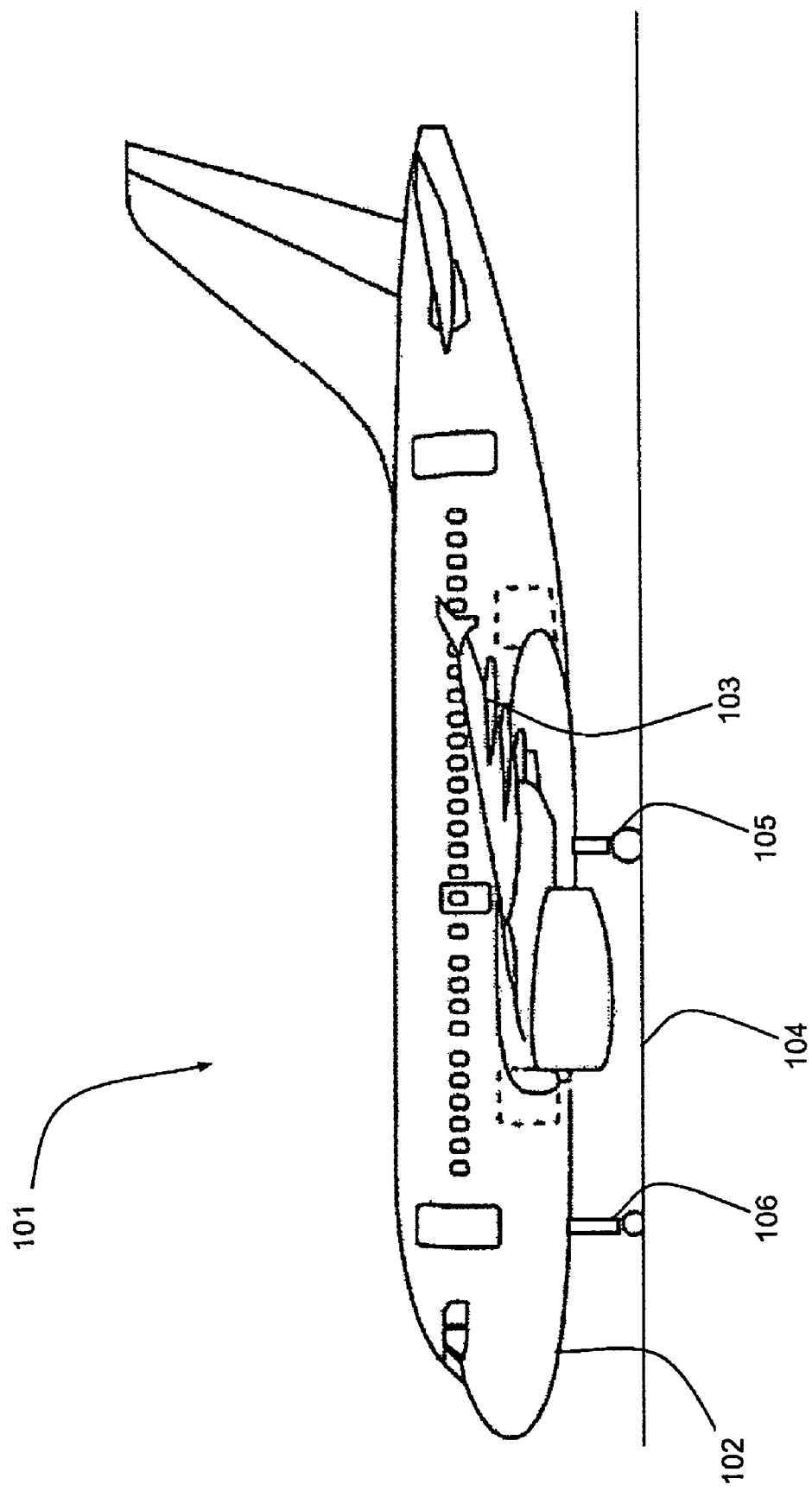
FIG. 1 is a side view of an aircraft.

With reference to FIG. 1, an aircraft 101 comprises a fuselage 102 and a set of wings 103 faired into the fuselage 102. The aircraft 101 is supported on the ground 104 by a set of landing gear or undercarriage in the form of main landing gear 105 and nose landing gear 106. The landing gear 105, 106 is arranged to be movable between a deployed position supporting the aircraft 101 on the ground 104 and a stowed position in a landing gear bay within the aircraft structure while the aircraft 101 is in flight. Also, in certain maintenance arrangements, the landing gear 105, 106 may be retracted while the aircraft 101 is on the ground but otherwise supported by jacks.

Figure 2B:
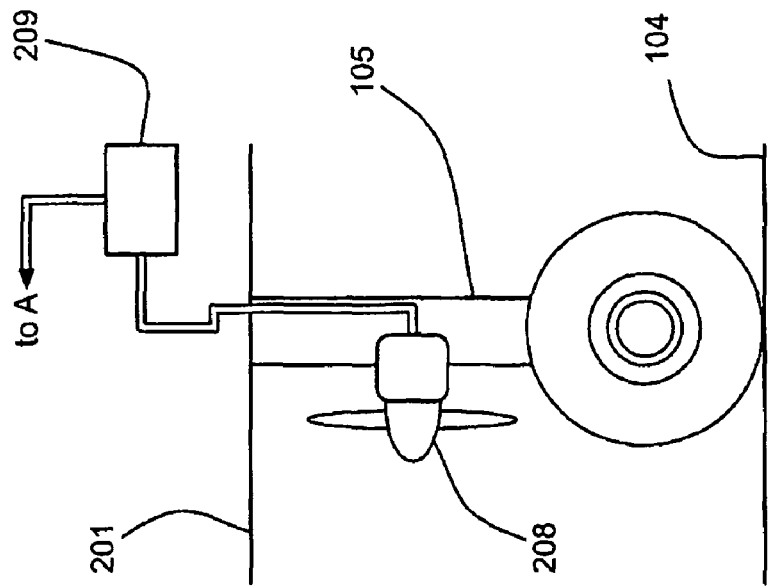
Figure 2A:
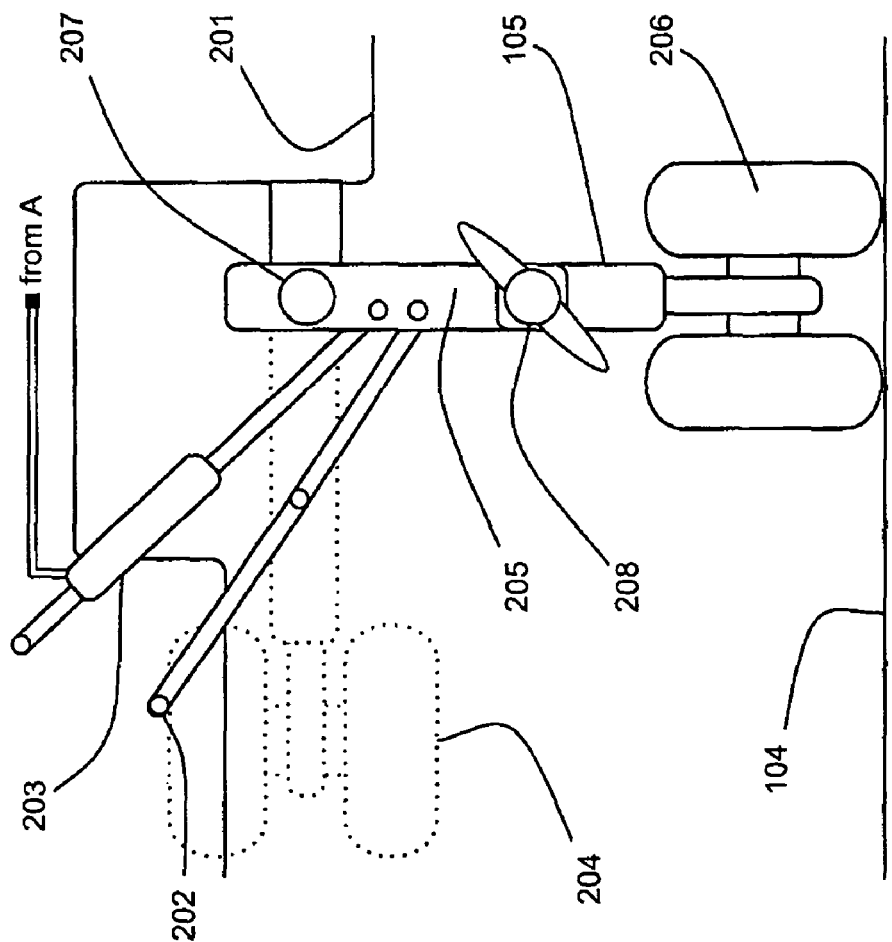
FIG. 2a is a partial sectional front view of one of the landing gear of the aircraft of FIG. 1.

FIG. 2a shows the deployed main landing gear 105 from the front in further detail. The landing gear is pivotably attached to the aircraft structure 201 and supported in the deployed position by a support strut 202. An actuator 203 is attached between the aircraft structure 201 and the inboard end of the landing gear 105 to enable the controlled movement of the landing gear 105 between the deployed position and a stowed position 204 indicated in FIG. 2a by dotted lines. The landing gear 105 comprises a main strut 205, which provides the point of attachment at its inboard end for the actuator 203, and bears a set of wheels 206 at its outboard end. The main strut 205 also provides the pivotable attachment between the landing gear 105 and the aircraft structure 201 via a pivot point 207.

The landing gear 105 further comprises a ram air turbine (RAT) 208 fixed to the main strut 205 inboard of the wheels 206 and outboard of the pivot point 207. The landing gear 105 is shown in further detail in the side view of FIG. 2b. The RAT 208 is connected to a control and actuating system 209 and is arranged to provide power to the control and actuating system 209 for the in-flight operation of the actuator 203 so as to move the landing gear 105 between its deployed and stowed positions.

Figure 3:
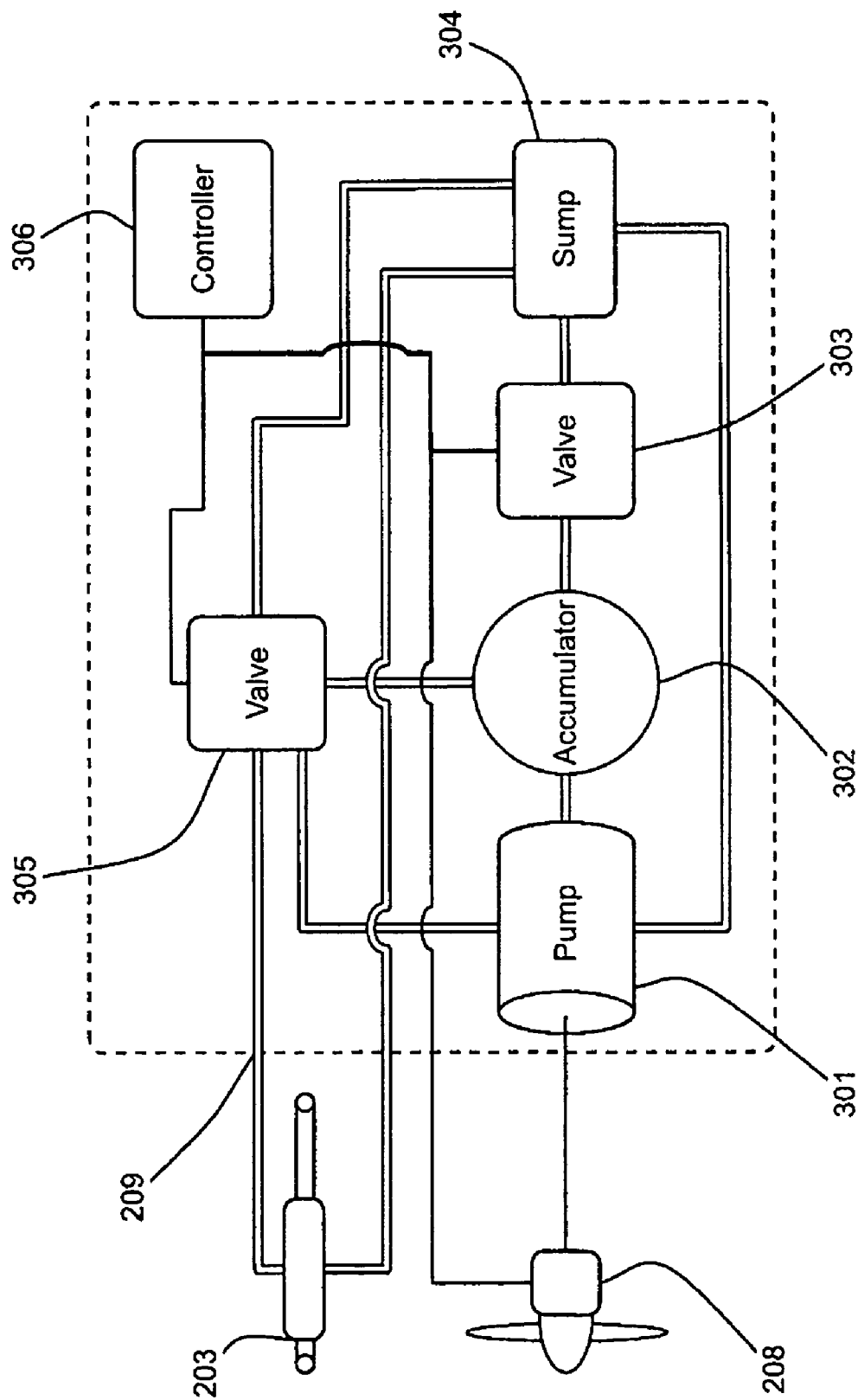
FIG. 3 is a schematic illustration of a control and actuating system for the landing gear of FIGS. 2a and 2b.

FIG. 3 shows the control and actuating system 209 in further detail. The RAT 208 connects to a hydraulics system, within the control and actuating system 209. The hydraulics system comprises a pump 301 connected to a hydraulic accumulator 302, which is further connected, via a first electrically operated hydraulic valve 303, to a hydraulic sump 304 and a second electrically operated hydraulic valve 305. The second valve 305 is also connected to the pump 301, the sump 304 and to the actuator 203. The pump 301 has a hydraulic feed from the sump 303. The RAT 208, first valve 303 and second valve 305 are electrically connected to a controller 306.

The controller 306 is arranged, using electrical control signals, to operate the valves 303, 305 so as to operate the actuator 203, to control the energy stored in the accumulator 302 within predefined limits and to control the output from the pump 301. The controller 306 is arranged to operate the actuator 203 in response to commands received from cockpit control systems (not shown) to move the landing gear 105 between its deployed and stowed positions. The controller 306 is arranged to control the output from the RAT 208 by feathering the turbine blades of the RAT 208 so as to govern its rotational energy. This in turn affects the output of the pump 301 and thereby the energy input to the accumulator 302. Thus the controller 306 is arranged to control the input to the accumulator 302 via its control of the RAT 208. The controller 306 is also arranged to control the level of energy in the accumulator 302 by venting the accumulator 302 to the sump 304 via the first valve 303. The second valve 305 enables the controller 306 to select the power source for the actuator 203 either from the accumulator 302 or directly from the pump 301. The second valve 305 also enables the controller 306 to vent hydraulic fluid from the actuator 203 to the sump 304.

By controlling the input and the output to the accumulator 302 the controller 306 is arranged to maintain the level of energy stored in the accumulator 302 within a set of predetermined limits. In the present embodiment, the set of limits comprises two energy levels. The first energy limit or the ambient charge is near zero and is maintained for the periods when the landing gear 105 is in its fully deployed or stowed positions. The first energy limit is also maintained in the first part of the deployment movement which is gravity driven as described in further detail below. The second energy level or operational charge is arranged to safely compensate for the loss in power from the RAT 208 when the RAT 208 is moved from a region of normal operational airflow to a region of lower airflow close to the structure of the aircraft. Such loss of power occurs in the latter part of the retraction movement. Thus the controller 306 is arranged to ensure that the accumulator 302 is sufficiently charged prior to the RAT 208 being moved into such a position.

Figure 4:
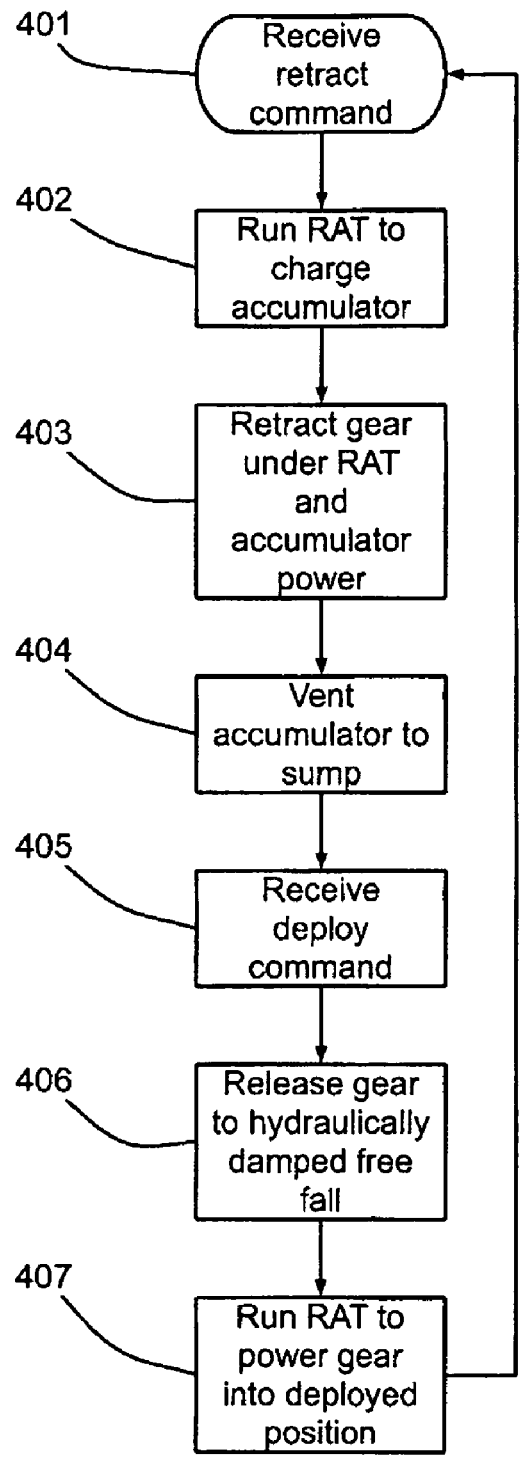
FIG. 4 is a flow chart illustrating the control process used in the control and actuating system of FIG. 3.

The processing performed by the controller 306 in response to landing gear deployment or retraction commands will now be described in further detail with reference to the flowchart of FIG. 4. At step 401, processing is initiated in response to a landing gear retraction command received by the controller 306 from the cockpit controls and processing moves to step 402. At step 402, the RAT 208 is run so as to charge the accumulator 302 to the second energy limit and, once this is reached, processing moves to step 403. At step 403 the second valve 305 is operated to power the actuator 203 from the accumulator 302, which continues to be charged via the RAT 208 and pump 301. Once the landing gear 105 has been fully retracted, processing moves to step 404. At step 404, the energy in the accumulator 302 is vented via the first valve 303 to the sump 304 to return the accumulator 302 to its first energy limit. Processing then moves to step 405 to await the receipt of a landing gear deployment command. When such a command is received, processing moves to step 406 where the landing gear 105 is released into hydraulically damped freefall and thus partially deploys under the weight of gravity to a point where the RAT 208 is located away from the aircraft structure and thus within an operational airflow. The hydraulic damping in the present embodiment is provided by the controlled release of the hydraulic pressure from the actuator 203 to the sump 304 via the second valve 305. Processing then moves to step 407 where the RAT 208 is activated so as to run the pump 301 to power the landing gear 105 into its fully deployed position. Once the landing gear 105 is in its fully deployed position, processing returns to step 401 to await a further landing gear retraction command as described above.

As will be understood by those skilled in the art, the valves described above enable multiple inputs to be simultaneously controlled so as to route each input to one or more outputs. Such valves may be provided by a single valve mechanism or by a set of individual valves either co-located or physically distributed. Also, in the above description of landing gear operation, the operation of other elements of the aircraft relating to the landing gear such as the operation of locks, bracing struts and landing gear bay doors is omitted for clarity. As will be understood by those skilled in the art, such ancillary operations may also be powered by the same mechanism as described in the embodiments of the invention. In another embodiment, the RAT provides hydraulic power directly to the accumulator. In a further embodiment, the landing gear operation system is wholly electrically powered. In another embodiment, an additional energy input is provided to the accumulator to enable it to be charged at times when no power is available from the RAT.

In a further embodiment, the pump has a controllable power output, speed or direction thus reducing the need to have a controllable RAT and enabling a simpler RAT to be used instead. In another embodiment, the RAT is of a simple fixed-vane type and the pump is a simple hydraulic pump without the ability to throttle it's output flow or pressure. The pressure fed to the accumulator is controlled by a bypass valve, which opens to bypass the accumulator and directs the flow to the sump when the pressure inside the accumulator is at a predetermined level. The valve may be mechanically, hydraulically or electrically actuated based on mechanical, electrical or hydraulic sensing of the accumulator pressure. In another embodiment, the control provided by the control system 306 may be provided manually via cockpit or other controls either as a replacement for automatic control or as an override arrangement.

In a further embodiment, during the first stage of the deployment of the landing gear, the energy produced by the hydraulic damping of the movement is used to charge to accumulator. This energy is then used to power the actuator to complete the deployment movement of the landing gear.

In another embodiment, during the retraction phase, once the accumulator has been charged to the second energy level, the stored energy is reserved for the final phase of the retraction movement where sufficient power is not available form the RAT. During the initial part of the retraction movement when the RAT is exposed to a suitable airflow, the actuator is powered solely from the RAT. In a further embodiment, the accumulator is charged via the RAT prior to the retraction command being received. For example, the RAT may be powered while the aircraft is in-flight with the landing gear deployed prior to landing or immediately after landing as the aircraft decelerates on a runway.

In a further embodiment, the RAT is retractable or has retractable turbine blades. In another embodiment, the RAT is located on an aircraft structure other than the landing gear thus enabling it to be deployed in an operational airflow for the whole of the movement of the landing gear between its stowed and deployed positions. In this arrangement, the RAT may be enclosed in a closable duct. Also, the accumulator may be omitted, as power is always available form the RAT. For example, the RAT may be integrated into another ram air system such as an air conditioning pack mounted in the belly fairing of the aircraft. Such air-conditioning packs draw ram air through doors or ducts in the belly fairing to pressurize the cabin and control the temperature. The air conditioning packs commonly comprise a RAT to extract power from the ram air. This turbine may be used to power the local landing gear system or an additional RAT may be provided for powering the landing gear.

In another embodiment, the power generated by the RAT is supplied for use by another aircraft landing system in the form of the braking system for the aircraft. The braking system may be associated with the same landing gear as the or each RAT. The energy generated by the RAT during the landing of the aircraft is used to power the braking system during the landing procedure. In a further embodiment, an energy storage device such as a hydraulic accumulator is used to store surplus energy extracted by the RAT to provide a store of power for the braking system. The power in the accumulator may be used to supplement the power from the RAT during periods of high demand or used when the RAT output below a predetermined threshold, for example, when the aircraft is stationary. The power from the RAT may be provided exclusively for a given aircraft landing system, in the form of the landing gear system or the braking system, or may be provided for more than one such system at a given time. The power generated after takeoff may be used for retracting the landing gear while the power generated on landing may be used to power the braking system.

As will be understood by those skilled in the art, the control system that controllably supplies the power from the RAT to a given aircraft landing system may be part of the RAT system itself or part of the relevant aircraft system or a separate system.

As will be understood by those skilled in the art, in the above embodiments, the power from the RAT is provided as at least part of the primary power source for the given aircraft landing system.

As will be understood by those skilled in the art, the power type, that is electrical, pneumatic, hydraulic or any other suitable power type, may be converted between one type and one or more other types within any part of the control, actuating or aircraft system depending on a given application. The hydraulic, pneumatic or electrically powered systems described above may form part of the global aircraft power systems or may be local substantially self-contained systems.

As will be appreciated by those skilled in the art, the actuator for the landing gear may be arranged in a number of alternative configurations. For example, the actuator may be mounted parallel to the landing gear leg or may be attached at various other suitable points along the main strut. Alternative arrangements also exists for connecting the landing gear strut to the aircraft structure, for example, by a mechanical linkage which governs its motion on retraction into the fuselage and whose motion is powered by the actuator.

As will be understood by those skilled in the art, while the embodiments above illustrate the application of the invention to main landing gear and to side retracting gear, the invention is also applicable to other powered mechanisms for retracting gear and to other types of landing gear such as nose landing gear. Furthermore, the wheel systems used for the landing gear described herein may be any suitable arrangement, such as the diabolo or two wheel landing gear having a common axle as shown in FIG. 2*a*, single wheel arrangements, bogey arrangements or any combination thereof.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. Apparatus for operating landing gear on an aircraft, said apparatus comprising:
   a landing gear actuating system operable to actuate the landing gear of an aircraft;
   a ram air turbine (RAT) located on said landing gear, said RAT arranged to provide a first power type to said actuating system; and
   a control system operable to controllably supply said first power type from said RAT to said actuating system for moving said landing gear between a deployed and stowed positions.

2. Apparatus according to claim 1 in which said RAT is located within a ram air duct in the aircraft structure.

3. Apparatus according to claim 1, in which said actuating system comprises an energy storage device.

4. Apparatus according to claim 3 in which said energy storage device is charged so as to compensate for any reduction in power provided by said RAT to said actuating system as a result of said RAT being moved into a reduced airflow in the proximity of an aircraft structure, said energy storage device being arranged to be charged so as to ensure the completion of the movement of said landing gear to said stowed position.

5. Apparatus according to claim 3, in which said energy storage device is charged prior to initiation of a movement of said landing gear.

6. Apparatus according to claim 3, in which said energy storage device is arranged to be charged via said RAT prior to any movement of said landing gear so as to provide power for a complete movement of said landing gear between said deployed and stowed positions.

7. Apparatus according to claim 3, in which said energy storage device is arranged to be charged with energy from said RAT for powering said braking system when the output of said RAT is below a predetermined threshold.

8. Apparatus according to claim 1 in which said RAT provides power to said actuating system for at least part of said movement of said landing gear between said stowed position and said deployed position.

9. Apparatus according to claim 1, in which said control system is further operable to supply said first power type from said RAT to a further aircraft landing system.

10. Apparatus according to claim 9 in which said further aircraft landing system is a braking system for said aircraft and said first power type is supplied from said RAT for the operation of said braking system during landing of said aircraft.

11. Apparatus according to claim 1, in which said actuating system or aircraft system is powered by a second power type and said control system is operable to convert said first power type from said RAT to said second power type.

12. Apparatus according to claim 11 in which said first or second power type is hydraulic, pneumatic or electric.

13. A method for operating landing gear on an aircraft, said method comprising the steps of:
   a) receiving a command to move a set of landing gear for an aircraft between a deployed and stowed positions;
   b) operating an actuating system arranged to move said landing gear between said deployed position and a stowed position; and
   c) directing power from a ram air turbine (RAT) located on said landing gear to said actuating system to move said landing gear between said deployed and stowed positions in response to said command.

14. A method according to claim 13 in which said RAT is located within a ram air duct in the aircraft structure.

15. A method according to claim 13, in which said actuating system comprises an energy storage device.

16. A method according to claim 15 in which said energy storage device is charged so as to compensate for any reduction in power provided by said RAT to said actuating system as a result of said RAT being moved into a reduced airflow in the proximity of an aircraft structure, said energy storage device being arranged to be charged so as to ensure the completion of the movement of said landing gear to said stowed position.

17. A method according to claim 15, in which said energy storage device is charged prior to initiation of a movement of said landing gear.

18. A method according to claim 15, in which said energy storage device is arranged to be charged via said RAT prior to any movement of said landing gear so as to provide power for a complete movement of said landing gear between said deployed and stowed positions.

19. A method according to claim 15, in which said energy storage device is arranged to be charged with energy from said RAT for powering said braking system when the output of said RAT is below a predetermined threshold.

20. A method according to claim 13, in which said RAT provides power to said actuating system for at least part of said movement of said landing gear between said stowed position and said deployed position.

21. A method according to claim 13, in which said control system is further operable to supply a first power type from said RAT to a further aircraft landing system.

22. A method according to claim 21 in which said further aircraft landing system is a braking system for said aircraft and said first power type is supplied from said RAT for the operation of said braking system during landing of said aircraft.

23. A method according to claim 21, in which said actuating system or aircraft landing system is powered by a second power type and said control system is operable to convert said first power type from said RAT to said second power type.

24. A method according to claim 23 in which said first or second power type is hydraulic, pneumatic or electric.

* * * * *